United States Patent [19]

Wrobel

[11] Patent Number: 4,470,054
[45] Date of Patent: Sep. 4, 1984

[54] OPTICAL DISC WRITE/READ APPARATUS WITH DISC MOUNTING MEANS

[75] Inventor: Joseph J. Wrobel, Rochester, N.Y.

[73] Assignee: Eastman Kodak Company, Rochester, N.Y.

[21] Appl. No.: 436,237

[22] Filed: Oct. 25, 1982

[51] Int. Cl.³ .................... G01D 15/32; G11B 5/16; B23B 31/18

[52] U.S. Cl. ............................ 346/137; 346/131; 346/135.1; 346/76 L; 369/271; 369/287

[58] Field of Search .................. 369/270, 271, 287; 346/76 L, 131, 135.1, 137

[56] References Cited

U.S. PATENT DOCUMENTS

| | | | |
|---|---|---|---|
| 3,720,415 | 3/1973 | Daniels et al. | 274/39 A |
| 4,358,843 | 11/1982 | Rager | 369/261 |
| 4,365,258 | 12/1982 | Geyer et al. | 346/137 |
| 4,403,319 | 9/1983 | Adamek et al. | 369/261 |

*Primary Examiner*—E. A. Goldberg
*Assistant Examiner*—Gerald E. Preston
*Attorney, Agent, or Firm*—Milton S. Sales

[57] ABSTRACT

An optical disc assembly for use with optical disc apparatus includes a flexible disc-shaped support. An annular retaining ring engages the support around its periphery. The support carries a record layer with an information storage region. Cooperating optical disc write/read apparatus has an annular, rotatable locating surface against which the support abuts. Annular spring means integral with the locating surface engage the retaining ring, applying a force to center the ring with respect to the axis of rotation of the locating surface, and to bring the support into a predetermined abutting force against the locating surface. This provides firm contact between the disc assembly support and the locating surface. The retaining ring holds the support in a first, predetermined circumferentially-symmetric storage tension. The abutting force of the support against the locating surface, induced by the spring means, may increase the tension in the support to a second, operating tension.

14 Claims, 3 Drawing Figures

OPTICAL DISC WRITE/READ APPARATUS WITH DISC MOUNTING MEANS

CROSS-REFERENCE TO RELATED APPLICATION

Reference is made herein to commonly-assigned, copending U.S. patent application Ser. No. 264,313, filed May 18, 1981 in the names of F. F. Geyer and E. M. Leonard.

BACKGROUND OF THE INVENTION

Field of the Invention

The present invention relates to record medium and apparatus useful in high density storage of information by optical writing and/or reading, and more particularly to improved configurations for optical disc assemblies and cooperating optical disc write/read apparatus.

Description of the Prior Art

The currently preferred optical disc technology employs disc elements with spiral or concentric tracks of minute (e.g., on the order of a micron or less in size), optically-detectable marks. One real-time mode of recording (writing) such marks is by scanning tracks on the disc with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out reflected from the recorded disc.

In order to write and read information in the form of such minute markings, optical systems of high numerical aperture are used to focus light to equivalently minute spots. Such optical systems have extremely small depths of focus and the proper positional relation between the writing or reading optical system, and the optical disc record surface must be stringently maintained both smooth and flat.

One approach to achieve requisite smoothness and flatness has been to form the disc substrate of glass with a ground and polished surface. This requires a time consuming and costly fabrication procedure. Another approach is to mold a plastic disc substrate with a highly finished surface and apply a surface smoothing sub-layer. However, it is extremely difficult to mold such plastic discs having adequate surface characteristics with a good yield; and this support fabrication method is also relatively costly.

Another approach for meeting smoothness, flatness and protective requirements is disclosed in commonly-assigned, copending U.S. patent application Ser. No. 264,313 filed May 18, 1981 in the names of F. F. Geyer and E. M. Leonard. In that approach an improved optical disc assembly adapted for high density storage of information comprises (i) a flexible, disc-shaped support carrying a record layer; (ii) a transparent disc cover sheet opposing the record layer, and (iii) an annular retaining ring for holding the support and cover sheet in circumferentially-symmetric tension. The support material may be held in a relatively low tension by the retaining ring and tensioned to an operating tension when drawn over a rotatable annular locating surface on the disc assembly receiving structure of the optical disc write/read apparatus. Thus the disc assembly can normally be kept with the support material in low "storage" tension, and used with the support material in higher "operating" tension to enhance flatness.

The disc-shaped support must be accurately centered on the locating surface so that the information tracks are closely concentric with the axis of rotation of the locating surface. The greater the degree of eccentricity of the mounted disc assembly, the more difficult it is for the write/read optics to follow the information trails.

SUMMARY OF THE INVENTION

The present invention is an improvement over the optical disc write/read apparatus of the aforementioned copending U.S. patent application. It is intended to assure accurate centering of the record layer relative to the focal plane of the optical system of the apparatus, and to place the support material in higher tension for its "operating" mode.

An optical disc assembly for use with the optical disc apparatus of the invention includes a flexible disc-shaped support. An annular retaining ring engages the support around its periphery. The support carries a record layer with an information storage region. Cooperating optical disc write/read apparatus in accordance with the present invention has an annular, rotatable locating surface against which the support abuts. Annular spring means integral with the locating surface engage the retaining ring, applying a force to center the ring with respect to the axis of rotation of the locating surface, and to bring the support into a predetermined abutting force against the locating surface. This provides firm contact between the disc assembly support and the locating surface.

Preferably, the retaining ring holds the support in a first, predetermined circumferentially-symmetric storage tension. The abutting force of the support against the locating surface, induced by the spring means, increases the tension in the support to a second, operating tension.

The invention and its objects and advantages, will become more apparent in the detailed description of the preferred embodiment presented below.

BRIEF DESCRIPTION OF THE DRAWINGS

The description of preferred embodiment refers to the attached drawings wherein.

DESCRIPTION OF THE PREFERRED EMBODIMENT

Figure 1:
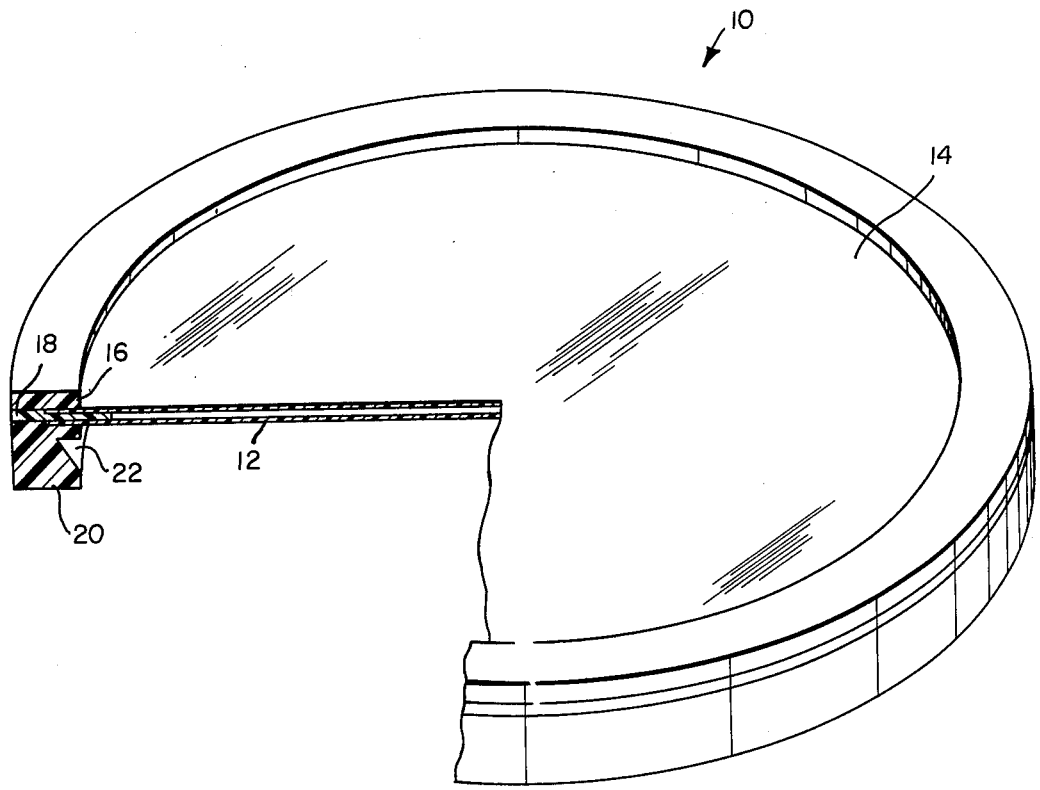
FIG. 1 is a fragmented perspective, schematic view of an optical disc assembly particularly suited for use with an optical disc write/read apparatus according to the present invention.

Referring to schematic FIG. 1, an optical disc assembly 10 includes a flexible, disc-shaped support 12 having record layer (and other appropriate layers) on one major surface of the support. The disc assembly also includes a continuous, flexible, disc-shaped cover sheet 14 which is substantially transparent with respect to the write and/or read wavelength suitable for use with the record layer. The diameter of cover sheet 14 corresponds generally to the diameter of support 12.

The support and cover sheet are held in spaced relation by an annular retaining ring which engages support 12 and cover sheet 14 substantially continuously around respective annular peripheral portions thereof. The record layer has a predetermined annular information storage region radially inwardly of the retaining ring. Reference is made to aformentioned U.S. patent application Ser. No. 264,313 for a description of useful and preferred materials and characteristics for the support and the cover sheet.

Cover sheet 14 and disc-shaped support 12 are retained in circumferentially-symmetric tension by cooperating annular ring members 16, 18 and 20 of the retaining ring. It is preferred that the cooperative engagement between disc-shaped support 12, cover sheet 14, and the retaining ring significantly seal the space between the record layer on support 12 and the opposed surface of cover sheet 14. Although not included in the illustrated embodiment, the optical disc assembly may have a central rigid hub for maintaining proper spacing between the record layer and the cover sheet.

Preferred tensions for the disc-shaped support and cover sheet materials are from substantially zero to just below the elastic limit, or yield point, of those materials. More specifically, the preferred tension depends upon the desired degree of planarity for the particular member (i.e. size, composition, etc.) used. It is preferred that "storage" and "operating" support material tensions be below the elastic limit of the particular material; however, in certain applications some yield can be acceptable as long as surface planarity remains in the desired tolerance. In general, the tension (particularly storage tension) should be selected with respect to the support material so that the stressed material's continuous relaxation over time (i.e. material creep) is slow enough to insure adequate spacing and planarizing tension throughout the expected product life period.

Several examples of suitable retaining rings are disclosed in the aforementioned copending U.S. patent application. Generally, the retaining ring has means for engaging support 12 and cover sheet 14, and for holding them in spaced relation under circumferentially-symmetric tension. The retaining ring illustrated in FIG. 1, and suitable for use with the write and/or read apparatus according to the present invention, has a relief with a conical bearing surface 22.

Figure 2:
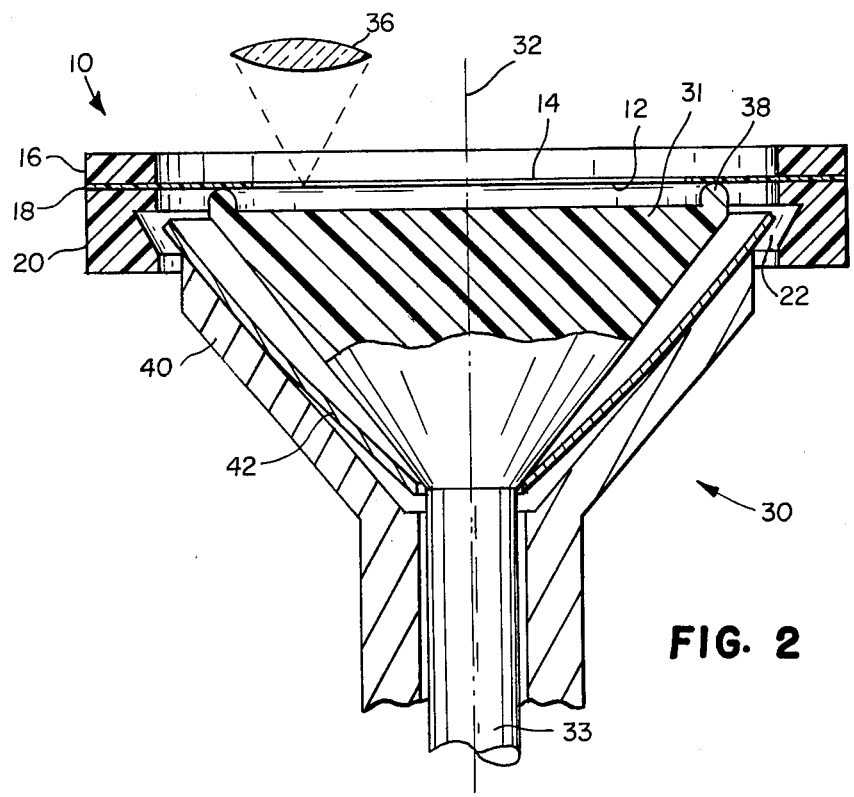
FIGS. 2 and 3 are sectional views of the optical disc assembly of FIG. 1 and cooperating optical disc write/read apparatus accordance to the present invention.
Figure 3:
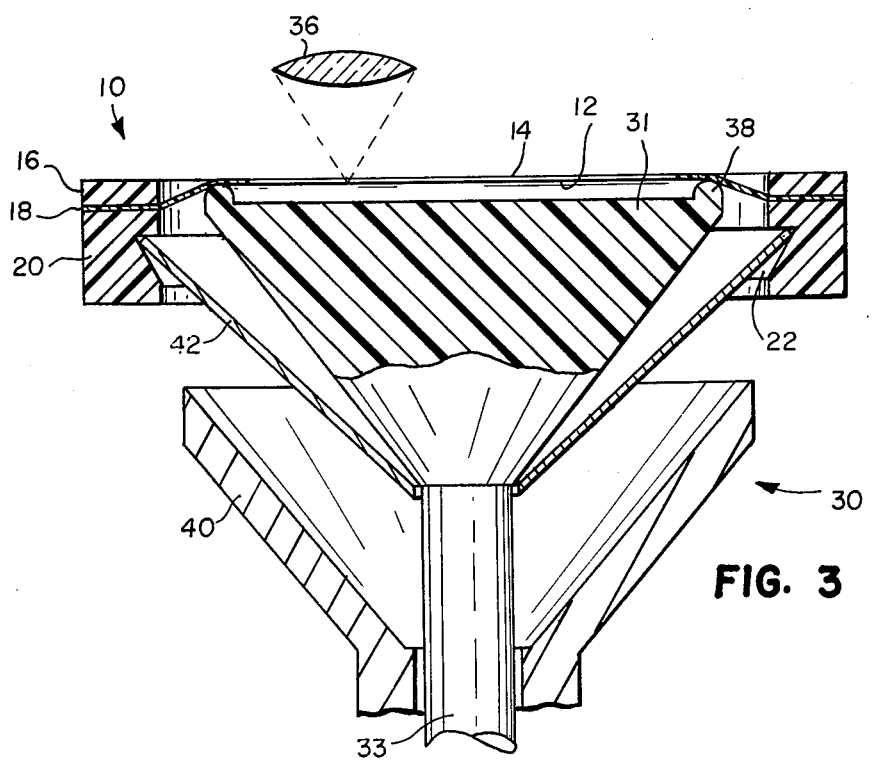

FIGS. 2 and 3 show a preferred embodiment of disc assembly receiving structure 30 on cooperating optical disc write/read apparatus useful in combinaton with the above-described optical disc assembly. The optical disc write/read apparatus is similar to the various other optical disc write/read apparatus known in the art, and only the disc assembly receiving structure 30 which cooperates more directly with the present disc assembly will be described in detail.

Disc assembly receiving structure 30 comprises a turntable 31 adapted for rotation about axis 32 on a spindle assembly 33 by drive means (not shown). The optical disc write/read apparatus also includes an optics system, represented by lens 36, which is adapted to focus write/read light in a focal plane that is normal to axis 32.

An annular locating surface 38 on turntable 31 rotates in a plane substantially normal to axis 32. Locating surface 38 is positioned to engage support 12 in an annular area radially outward of the annular information storage region of the record layer 13. The locating surface has predetermined dimensions with respect to the focal plane of the optics system of the disc write/read apparatus and the thickness of support 12 so that the recording layer of a disc assembly located on the turntable will closely proximate a nominal focal plane position of lens 36.

Turntable 31 has an annular, conically-shaped sleeve 40 mounted for axial movement along spindle assembly 33. A Belleville spring 42 is captured between turntable 31 and sleeve 40.

A Belleville spring is essentially a coned or dished disc having a diametral cross section as shown in FIG. 3. In its usual uses, the spring is loaded axially and tends to flatten out, spring action being thus obtained. However, in the illustrated embodiment of the present invention, spring 42 is loaded radially inwardly, or substantially so, to decrease its outer diameter and to increase its axial length (in the vertical direction as shown in FIGS. 2 and 3).

Such loading is effected by sliding sleeve axially along spindle assembly 33 to its position shown in FIG. 2. The lower, radially inward-most portion of Belleville spring 42 is captured by conical turntable 31 so that sleeve 40 releasably deflects the upper, radially outward-most portion of the spring up and in, loading the spring.

With sleeve 40 raised and spring 42 deflected as shown in FIG. 2, optical disc assembly 10 can be mounted on receiving structure 30. Ring member 20 passes over the deflected spring until support 12 rests on locating surface 38. Sleeve 40 can now be slid away from spring 42, allowing the upper end of the spring to expand and enter the annular relief on the inside of ring member 20. Initial contact of spring 42 and conical bearing surface 22 applies a resilient radial force to disc assembly 10. Support 12 slides over locating surface 38 until centered about rotation axis 32. This position is highly repeatable, assuring that the information tracks on the record layer of support 12 are closely concentric with the axis of rotation of the disc assembly.

As sleeve 40 continues to move down spindle assembly 33, the force on surface 22 from the expanding upper edge of the Belleville spring 42 picks up an axial component and draws ring member 20 down under turntable 31, tensioning support 12 and cover sheet 14 over locating surface 38, as shown in FIG. 3. When the axial force component of spring 42 on bearing surface 22 is balanced by the circumferentially-symmetric tension forces in the support and cover sheet, movement of the ring stops. Good contact between support 12 and locating surface 38 is assured. Suitable load-deflection characteristics of spring 42 for proper tensioning of the support and cover sheet can be empirically obtained by varying the ratio between cone height and thickness.

The invention has been described in detail with particular reference to certain preferred embodiments thereof, but it will be understood that variations and modifications can be effected within the spirt and scope of the invention.

What is claimed is:

1. Optical disc write and/or read apparatus adapted for use with an optical disc assembly which includes (1) a flexible, disc-shaped support carrying a record layer and (2) an annular retaining ring engaging the support around its peripheral region; said apparatus comprising
    (a) lens means for focusing light at a focal plane normal to a predetermined axis;
    (b) an annular locating surface rotatable about said axis in a plane normal to said axis;
    (c) annular spring means having an inner region mounted integrally with said locating surface and an outer region adapted to engage the annular retaining ring of an optical disc assembly such as to apply a force to the retaining ring to center the ring and to bring the support into a predetermined abutting force against said locating surface to provide firm contact between the disc assembly support and said locating surface.

2. Optical disc write and/or read apparatus as claimed in claim 1 further comprising means for releasably deflecting the outer region of said spring means away from engagement with the annular retaining, whereby the optical disc assembly may be mounted on and removed from said write and/or read apparatus.

3. Optical disc write and/or read apparatus as claimed in claim 1 wherein said annular spring means comprises a Belleville spring adapted to apply to the retaining ring a resilient force with radially outward and axial components, said outward component being in the direction to center the ring about said axis and said axial component being in the direction to urge the support against said locating surface.

4. Optical disc write and/or read apparatus as claimed in claim 3 further comprising means for releasably deflecting said Belleville spring away from force-applying engagement with the retaining ring.

5. Optical disc write and/or read apparatus as claimed in claim 4 wherein said deflecting means comprises an annular sleeve slidable axially over said Belleville spring.

6. Optical disc write and/or read apparatus adapted for use with an optical disc assembly which includes (1) a flexible, disc-shaped support carrying a record layer and (2) an annular retaining ring engaging the support around its peripheral region for holding the support in a first predetermined circumferentially-symmetric tension suitable for storage of the assembly; said apparatus comprising (a) lens means for focusing light at a focal plane normal to a predetermined axis;

(b) an annular locating surface rotatable about said axis in a plane normal to said axis;

(c) annular spring means having an inner region mounted integrally with said locating surface and an outer region adapted to engage the annular retaining ring of an optical disc assembly such as to apply a force to the retaining ring to center the ring and to bring the support into a predetermined abutting force against said locating surface to (1) provide firm contact between the disc assembly support and said locating surface and (2) effect a second and greater predetermined circumferentially-symmetric tensin in the support during use.

7. Optical disc write and/or read apparatus as claimd in claim 6 wherein said annular spring means comprises a Belleville spring adapted to apply to the retaining ring a resilient force with radially outward and axial components, said outward component being in the direction to center the ring about said axis and said axial component being in the direction to urge the support against said locating surface.

8. Optical disc write and/or read apparatus as claimed in claim 7 further comprising means for releasably deflecting said Belleville spring away from force-applying engagement with the retaining ring.

9. Optical disc write and/or read apparatus as claimed in claim 8 wherein said deflecting means comprises an annular sleeve slidable axially over said Belleville spring.

10. Optical disc write and/or read apparatus adapted for use with an optical disc assembly having a flexible, disc-shaped web assembly including (1) a support carrying a record layer (2) a cover sheet generally coextensive with the support, (3) annular spacing means between the support and the cover sheet for forming an axial space between the record layer and the cover sheet, (4) an information storage region radially inwardly of the spacing means, and (5) an annular retaining ring engaging the web assembly radially outwardly of the information storage region; said apparatus comprising (a) lens means for focusing light at a focal plane normal to a predetermined axis;

(b) an annular locating surface rotatable about said axis in a plane normal to said axis;

(c) annular spring means having an inner region mounted integrally with said locating surface and an outer region adapted to engage the annular retaining ring of an optical disc assembly such as to apply a force to the retaining ring to center the ring and to bring the support into a predetermined abutting force against said locating surface to provide firm annular contact between the disc assembly support and said locating surface in the annular region of the spacing means.

11. Optical disc write and/or read apparatus as claimed in claim 10 further comprising means for releasably deflecting the outer region of said spring means away from engagement with the annular retaining, whereby the optical disc assembly may be mounted on and removed from said write and/or read apparatus.

12. Optical disc write and/or read apparatus as claimed in claim 10 wherein said annular spring means comprises a Belleville spring adapted to apply to the retaining ring a resilient force with radially outward and axial components, said outward component being in the direction to center the ring about said axis and said axial component being in the direction to urge the support against said locating surface.

13. Optical disc write and/or read apparaus as claimed in claim 12 further comprising means for releasably deflecting said Belleville spring away from force-appying engagement with the retaining ring.

14. Optical disc write and/or read apparatus as claimed in claim 13 wherein said deflecting means comprises an annular sleeve slidable axially over said Belleville spring.

* * * * *